United States Patent
Nie

(10) Patent No.: US 9,471,782 B2
(45) Date of Patent: Oct. 18, 2016

(54) FILE SCANNING METHOD AND SYSTEM, CLIENT AND SERVER

(71) Applicant: Tencent Technology (Shenzhen) Company Limited, Shenzhen, Guangdong (CN)

(72) Inventor: Zixiao Nie, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 102 days.

(21) Appl. No.: 14/275,173

(22) Filed: May 12, 2014

(65) Prior Publication Data

US 2014/0304812 A1 Oct. 9, 2014

Related U.S. Application Data

(63) Continuation of application No. PCT/CN2013/088489, filed on Dec. 4, 2013.

(30) Foreign Application Priority Data

Apr. 8, 2013 (CN) .......................... 2013 1 0119396

(51) Int. Cl.
*G06F 11/00* (2006.01)
*G06F 21/56* (2013.01)

(52) U.S. Cl.
CPC .................................. *G06F 21/564* (2013.01)

(58) Field of Classification Search
CPC ........... H04L 63/1416; H04L 63/1425; H04L 63/1433; H04L 63/1441; H04L 63/145
USPC ....... 726/22–25; 713/188; 709/224–225, 229
See application file for complete search history.

(56) References Cited

U.S. PATENT DOCUMENTS

| 7,043,758 B2 * | 5/2006 | Grupe .................. G06F 21/562 726/24 |
| 7,502,939 B2 * | 3/2009 | Radatti ................. G06F 21/563 713/188 |

(Continued)

FOREIGN PATENT DOCUMENTS

| CN | 102521549 A | 6/2012 |
| CN | 102799804 A | 11/2012 |

(Continued)

OTHER PUBLICATIONS

Chinese Office Action with English translation, dated Mar. 10, 2015, pp. 1-10, issued in Chinese Patent Application No. 2013-10119396. 7, State Intellectual Property Office, Beijing, The P.R. China.

(Continued)

*Primary Examiner* — Hosuk Song
(74) *Attorney, Agent, or Firm* — Brinks Gilson & Lione

(57) ABSTRACT

A file scanning method and a file scanning system, a client and a server are disclosed. The server may determine a property indicator of a file, that represents probability of the file being a malicious program. The server may make this determination based on a comprehensive consideration of attribute information of the file. The attribute information may be reported by a plurality of clients. The server may send the property indicator to the clients. The clients may determine, according to the property indicator, a scanning strategy on whether to scan the file. Alternatively, the server may determine, according to the property indicator, a scanning strategy on whether to scan the file, and may send the scanning strategy to the clients. The clients may scan the file in accordance with the scanning strategy. Accordingly, only the file with higher probability of being a malicious program may be selectively scanned.

15 Claims, 8 Drawing Sheets

(56) References Cited

U.S. PATENT DOCUMENTS

| | | | | |
|---|---|---|---|---|
| 7,540,031 B2* | 5/2009 | Kouznetsov | ............ | G06F 21/56 380/270 |
| 8,112,801 B2* | 2/2012 | Abdel-Aziz | ........ | H04L 63/1425 713/160 |
| 8,214,901 B2* | 7/2012 | Porras | ................... | G06F 21/566 705/51 |
| 2006/0161987 A1* | 7/2006 | Levy-Yurista | .......... | G06F 21/56 726/24 |
| 2009/0307776 A1* | 12/2009 | Curnyn | ................ | G06F 21/566 726/24 |
| 2010/0257609 A1 | 10/2010 | Niemelä | | |

FOREIGN PATENT DOCUMENTS

| | | |
|---|---|---|
| CN | 102799823 A | 11/2012 |
| CN | 102999726 A | 3/2013 |
| CN | 103177217 A | 6/2013 |

OTHER PUBLICATIONS

International Search Report, dated Mar. 13, 2014, pp. 1-2, International Patent Appliction No. PCT/2013/088489, The State Intellectual Property Office, the P.R. China, Beijing, China.

* cited by examiner

FILE SCANNING METHOD AND SYSTEM, CLIENT AND SERVER

CROSS REFERENCE TO RELATED APPLICATION

The present application is a continuation of PCT Application No. PCT/CN2013/088489, filed on Dec. 4, 2013, which claims the priority to Chinese Patent Application No. 201310119396.7, entitled as "FILE SCANNING METHOD AND SYSTEM, CLIENT AND SERVER", filed on Apr. 8, 2013 with State Intellectual Property Office of People's Republic of China, both of which are incorporated herein by reference in their entireties.

TECHNICAL FIELD

The present disclosure relates to communication technology and in particular to a file scanning method, a file scanning system, a client and a server.

BACKGROUND

With the development of information technology, use of computers for everyday tasks has increased. Computers may be susceptible to attacks from trojans, viruses and other malicious software. Development of trojans and viruses may be prevented by employing a real-time file monitoring system, so that the virus and/or trojans can be found timely, and the danger can be avoided.

Typically, with the real-time file monitoring system, file operations in a computer system can be monitored in real time in accordance with a determined strategy. When a file operation event is monitored, a virus scanning engine is activated. The engine may scan the file and further intercepting and anti-virus operations may be performed based on the result from the scanning engine. However, the number of file operations in the system may be huge, and the occurrence of viruses is an event with relatively lower probability, so that the benefit from the real-time file monitoring system is poor.

SUMMARY

The present disclosure provides a file scanning method, a file scanning system, a client and a server, so as to reduce the number of the files to be scanned in order to protect the system. As a result, the effect of such continuous file monitoring on other operations of the system is reduced.

A file scanning method is provided in an embodiment of the disclosure. The file scanning method may include determining a property indicator of a file according to attribute information of the file reported by multiple clients. The property indicator may be indicative of probability of the file being a malicious program. The method may further include sending the property indicator to the clients. In response the clients determine, according to the property indicator, whether to scan the file. Alternatively, the server may determine, according to the property indicator, a scanning strategy on whether to scan the file, and may send the scanning strategy for the file to the clients.

In another example of a file scanning method per another embodiment of the disclosure, clients may report attribute information of a file to a server. The server may further involve receiving from the server a scanning strategy on whether to scan the file. The scanning strategy may be returned by the server according to the attribute information of the file reported by the clients. Alternatively, the clients may receive from the server a property indicator of the file. The clients may generate, according to the property indicator, a scanning strategy on whether to scan the file. The property indicator may be returned by the server according to the attribute information of the file reported by the clients.

In another aspect, a server in an embodiment may include circuitry such as a property indicator determining unit, configured to determine a property indicator of a file according to attribute information of the file reported by a plurality of clients. The property indicator may be indicative of probability of the file being a malicious program. The server may also include a sending unit, configured to send the property indicator to the clients. The clients may determine, according to the property indicator, whether to scan the file. Alternatively, the sending unit may obtain, according to the property indicator, a scanning strategy and send the scanning strategy for the file to the clients. The scanning strategy indicates on whether to scan the file.

In a further aspect, a client in an embodiment may include circuitry such as an attribute reporting unit that may report attribute information of a file to a server. The client may also include a file scanning unit that may receive from the server a scanning strategy. The scanning strategy indicates whether to scan the file. The scanning strategy may be returned by the server according to the attribute information of the file reported by a plurality of clients. Alternatively the file scanning unit may receive from the server a property indicator of the file. The file scanning unit may, in response, determine the scanning strategy according to the property indicator. The property indicator may be returned by the server according to the attribute information of the file reported by the plurality of clients.

In yet another aspect, a file scanning system is provided, which may include a plurality of clients and a server. The server may include a property indicator determining unit that may determine a property indicator of a file according to attribute information of the file. The property indicator may be indicative of probability of the file being a malicious program. The server may also include a sending unit that may send the property indicator to the clients. The clients, in response, may determine whether to scan the file, based on the property indicator. Alternatively the sending unit may obtain a scanning strategy. The scanning strategy indicates whether to scan the file, based on the property indicator. The sending unit may send the scanning strategy for the file to the clients. An example client of the multiple clients may include an attribute reporting unit that may report the attribute information of the file to a server. The terminal may further include a file scanning unit that may receive, from the server, a scanning strategy. The scanning strategy represents whether to scan the file. The scanning strategy may be returned by the server according to the attribute information of the file reported by a plurality of clients. The file scanning unit may alternatively, receive from the server a property indicator of the file. The file scanning unit may obtain, according to the received property indicator, the scanning strategy. The property indicator may be returned by the server according to the attribute information of the file reported by the plurality of clients.

The embodiments of the disclosure describe examples of providing real-time file protection. The real-time file protection, involves a server determining a property indicator of a file, based on a comprehensive consideration of the attribute information of the file reported by a plurality of clients. The property indicator of the file indicates the probability of the file being a malicious program. The server may send the property indicator to the clients, and allow the clients to determine, based on the property indicator, a scanning strategy on whether to scan the file. In other examples, the server may determine, according to the property indicator, the scanning strategy of whether to scan the file, and may send the scanning strategy to the clients. In either case, the clients scan the file in accordance with the scanning strategy for the file. The real-time file protection provided may be advantageous as only the file which has a higher probability of being a malicious program will be scanned. Therefore, the number of files to be scanned during the protection can be reduced, and the corresponding time spent is shortened. Further, since such scanning may be resource intensive, the effects on the other operations in the server may be reduced.

BRIEF DESCRIPTION OF THE DRAWINGS

In order to illustrate the technical solutions described by the embodiments of the present disclosure more clearly, following drawings are used. The drawings described hereinafter are only some embodiments of the present disclosure, and other drawings may be obtained by those skilled in the art based on these drawings without creative labor.

DETAILED DESCRIPTION

Hereinafter, the technical solutions of the present disclosure are described using examples of embodiments of the solutions. The embodiments are described below in conjunction with the drawings. The described embodiments are only some of the possible embodiments of the present disclosure, and not all the possible embodiments. All other embodiments obtained by those skilled in the art based on the embodiments in the present disclosure without creative labor will fall within the scope of protection of the present disclosure.

Figure 1:
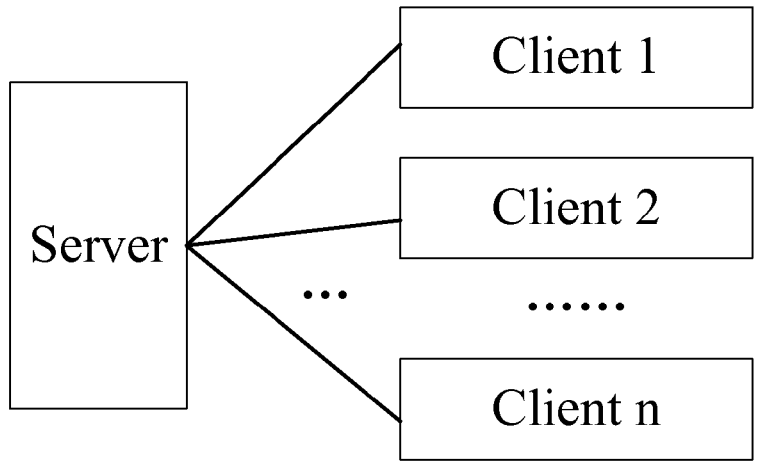
FIG. 1 is a schematic structural diagram of an example file scanning system.

A file scanning method is described further. The file scanning method is generally applied in a system as shown in FIG. 1. The system may include a server computer, referred to as a server, and one or more client computers, referred to as clients. The method may be performed by the server, and may include at least the exemplary steps shown by the flow chart in FIG. 2. The method may include at least the following steps 101 to 103.

Step 101, may involve determining a property indicator of a file according to the received attribute information of the file. The attribute information may be reported by the clients. The property indicator may be indicative of probability of the file being a malicious program. The method may move to step 102 or 103, after step 101.

The attribute information may be the information for describing the file, and may include, but is not limited to, at least one of path information of the file (storage address information of the file), loading information of the file (information during the loading of the file into a memory), releasing information of the file (information during the releasing of the file), a black-white attribute of the file (such as information whether the file is a malicious program), context information of a program corresponding to the file (such as information of a parent procedure) and the like.

A client may periodically or time to time scan the file stored locally on the client, and may report the attribute information of the file to the server. The client may determine, a preset attribute reporting strategy. The strategy may determine which attribute information of the file is to be reported by the client. The preset attribute reporting strategy may further prescribe particular attribute information of the file to be reported in specific cases. Alternatively, or in addition, a client may report the attribute information according to instructions sent from the server. For example, the server may send instruction to the clients indicating which attribute information of the file is to be reported, and further, the instruction information may instruct the client a specific case in which the client needs to report the attribute information of the file.

Different clients may have a respective copy of the same file. The manner in which the file is save on different clients may be different. Therefore, the attribute information of the file reported by the different clients may be different. The server may gather the different attribute information of the same file reported by the clients, and may determine the probability of the file being a malicious program. The probability may be referred to as a property indicator of the file. The property indicator of the file may be determined in multiple ways, such as those described further.

Figure 3A:
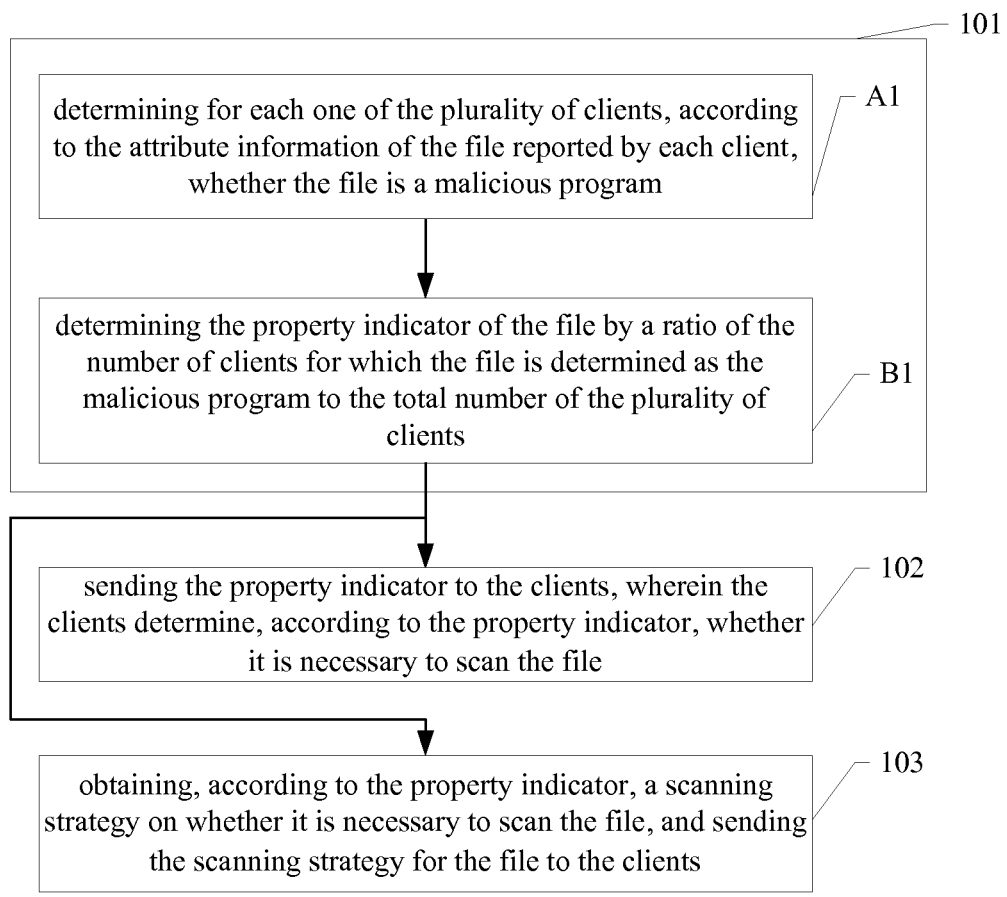
FIG. 3a is a flow chart of exemplary steps performed by an example server during a file scanning method performed according to another embodiment of the disclosure.

In an example, a client may report information corresponding to only one attribute. For example, any one of the foregoing attribute information may be reported. For example, a client may send the black-white attribute of the file. The server may determine the property indicator of the file using the following steps A1 to B1. The flow chart shown in FIG. 3a illustrates such exemplary steps.

A1 illustrates determining for each one of the plurality of clients, according to the attribute information of the file reported by each client, whether the file is a malicious program. For example, it may be determined whether the attribute information of the file reported by each client conforms to a preset strategy. A determination may be made as to whether the attribute information of the file reported by each client conforms to attribute information of a malicious program. In an example, if the attribute information of the file reported by one client conforms to the preset strategy, the file may be deemed as a malicious program; otherwise, the file may not be considered a malicious program.

B1 may involve determining the property indicator of the file. A ratio of the number of clients for which the file is determined as the malicious program to the total number of clients may be used. For example, according to the attribute information of the file reported by a total of M clients, the server may determine that for N clients the file is determined as a malicious program. In this case, the obtained property indicator of the file is N/M.

Figure 3B:
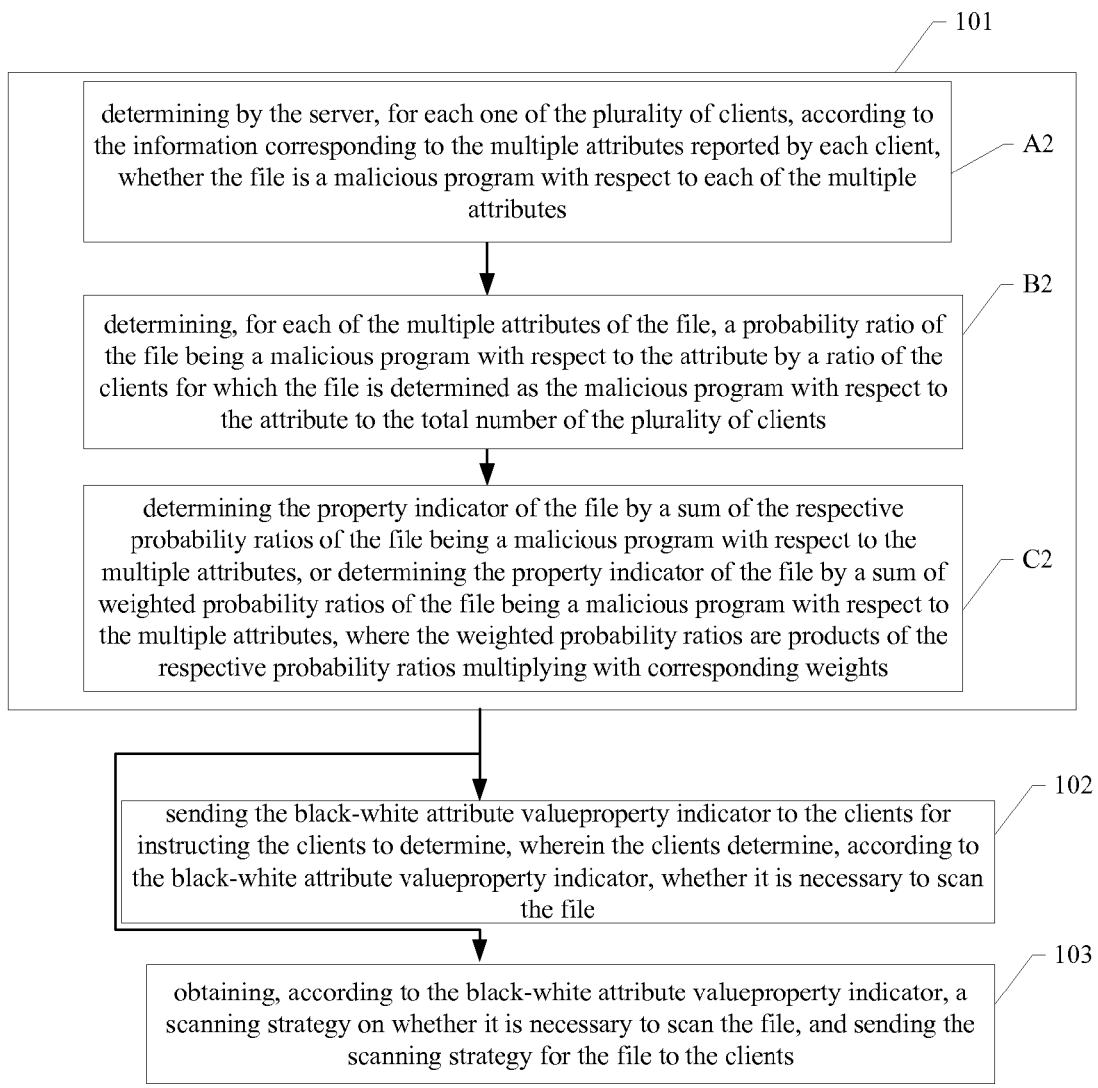
FIG. 3b is a flow chart of exemplary steps performed by an example server during a file scanning method performed an embodiment of the disclosure.

In another example, multiple attributes may be reported by each client as part of the reported attribute information of the file. Several of the foregoing attribute information, may be reported together. For example, each client may report the black-white attribute of the file and the path information of the file. The server may determine the property indicator of the file, in this case, according to the following example steps A2 to C2. A flow chart, illustrating the example steps, is shown in FIG. 3b.

A2, in an example, may involve determining by the server, for each one of the plurality of clients, according to the information corresponding to the multiple attributes reported by each client, whether the file is a malicious program with respect to each of the multiple attributes respectively. The server may determine whether the information corresponding to each attribute reported by each client conforms to a preset strategy. The attribute information corresponding to each attribute reported by each client may be compared to a predetermined attribute information and based on how similar the attribute information is to the predetermined attribute information, the file may be deemed as a malicious program. For example, if a preset strategy, or threshold of conformance, for an attribute is met, the file may be assessed to be a malicious program with respect to this attribute. In this way, whether the file is a malicious program with respect to the respective attributes may be obtained for each client.

In B2, for each of the multiple attributes of the file, a probability ratio of the file being a malicious program with respect to the attribute may be determined. For example, a ratio of the number of clients for which the file is determined as a malicious program with respect to a particular attribute of the file to the total number of the plurality of clients may be calculated.

In C2, the property indicator of the file may be determined by calculating a sum of the respective probability ratios of the file. The ratios indicate determined probability as to whether the file may be a malicious program according to the multiple attributes of the file. Alternatively, the property indicator of the file may be determined using a sum of weighted probability ratios of the file being a malicious program with respect to the multiple attributes. The weighted probability ratios may be products of the respective probability ratios and corresponding weights.

For example, each client may report attribute information corresponding to two attributes of the file, such as, information of an attribute 'a' and information of an attribute 'b'. The server may initially obtain, for each respective client, first information on whether the file is a malicious program with respect to the attribute 'a' according to the information of the attribute 'a' reported from each client. For example, the server may determine whether the information of the attribute 'a' reported from a client is in accordance with a first preset strategy. The server may obtain such first information for each respective client. Based on the first information from each client, the server may determine that there are n1 clients for which the file is a malicious program with respect to the attribute 'a'. The server may further obtain, for each of the clients, a second information on whether the file is a malicious program with respect to the attribute 'b' according to the information of the attribute 'b' reported from each client. The server may determine for each respective client whether the information of the attribute 'b' reported from each client is in accordance with a second preset strategy. The server may then obtain the second information for the clients, for example, based on a determination that there are n2 clients for which the file is a malicious program with respect to the attribute 'b'.

The server may further determine, for the attribute 'a', a ratio of the number n1 of the clients for which the file is determined as a malicious program to the total number m of the plurality of clients, n1/m. The ratio may be the probability ratio of the file being a malicious program with respect to the attribute 'a'. The server may also determine a ratio for the attribute b, using the number n2 of the clients for which the file is determined as a malicious program and the total number m of the plurality of clients, n2/m. This ratio may be the probability ratio of the file being a malicious program with respect to the attribute 'b'.

The probability ratios of the file being a malicious program obtained with respect to the respective attributes may be added to obtain the property indicator of the file. For example, in above example, the property indicator may be a result of $(n1/m)+(n2/m)$. Alternatively, the probability ratios of the file may be multiplied with corresponding weight values, for example, x1 and x2, respectively. The products may be added to obtain the property indicator of the file, for example, $x1*(n1/m)+x2*(n2/m)$. Each weight value may be set by a user based on experience. If the information of one attribute of the file is relatively more important for determining whether the file is a malicious program, the weight value corresponding to this attribute may be set to be greater than the other.

Step 102, may involve sending the property indicator to the clients. The clients may determine, according to the property indicator, whether to scan the file. Accordingly, the clients may scan the file.

Step 103, may involve determining at the server, according to the property indicator, a scanning strategy indicating whether to scan the file, and sending the scanning strategy for the file to the clients. Accordingly, the clients may scan the file according to the scanning strategy.

If it is determined that it may be advantageous for the clients to scan the file, the property indicator may be compared with a preset value. If it is determined that the property indicator is greater than the preset value, it may indicate that the file has a greater probability to be a malicious program, and it may be safest for the clients to scan the file as a preventative action. If the property indicator is less than or equal to the preset value, it may indicate that the file has a lesser probability to be a malicious program, and the clients may skip scanning the file, at least at this time.

The server may continuously perform the steps 101 and 102, or the steps 101 and 103, for updating the information on whether the clients should scan the file.

Thus, real-time file protection may be continuously provided in which, the server may determine a property indicator of a file. The property indicator may be calculated based on comprehensive consideration of the attribute information of the file reported by a number of clients. The property indicator of the file indicates a probability of the file being a malicious program. The server may send the property indicator to the clients. The clients may determine, according to the property indicator, a scanning strategy on whether to scan the file. Alternatively, the server may determine, according to the property indicator, a scanning strategy on whether to scan the file, and may further send the scanning strategy to the clients. The clients may scan the file in accordance with the scanning strategy for the file. Accordingly, only the file which has a higher probability to be a malicious program may be selectively scanned. Therefore, the number of the files to be scanned during the file protection may be reduced, and thus the time spent may be reduced. Further, the effect on the other operations in the server may be reduced, as resources may be used more efficiently for the file protection.

Figure 4:
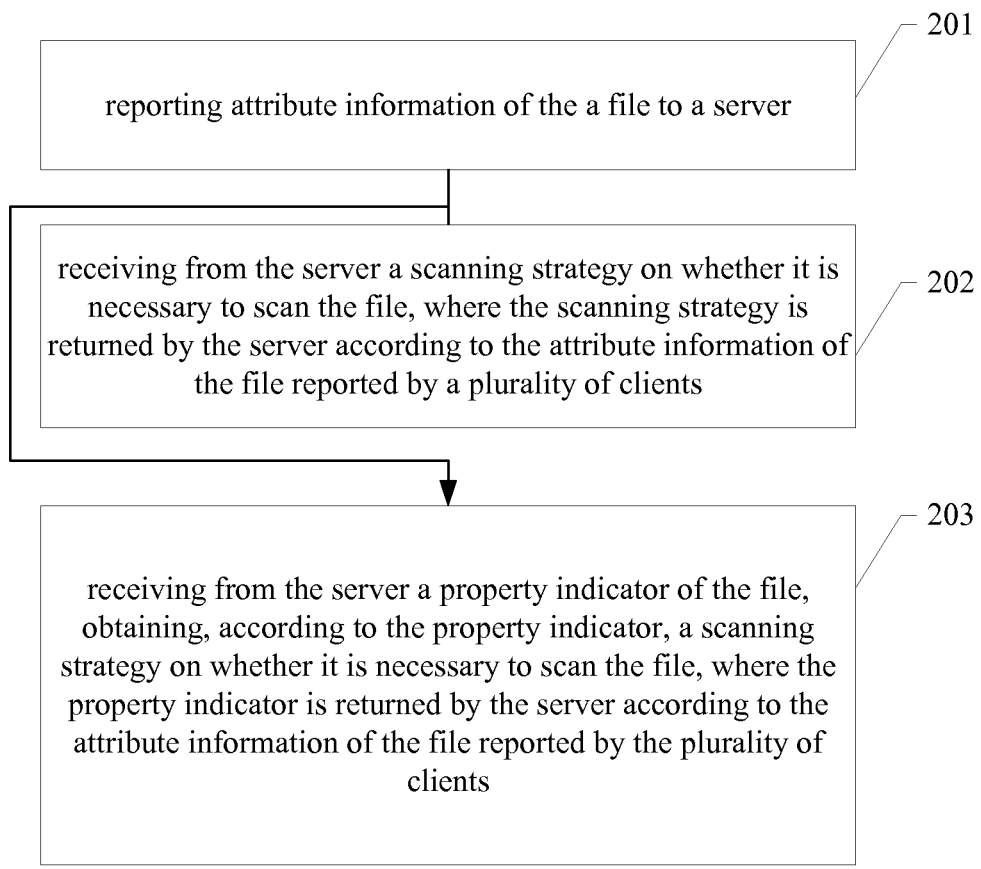
FIG. 4 is a flow chart of exemplary steps performed by an example client during a file scanning method performed according to an embodiment of the disclosure.

Another example file scanning method according to an embodiment of the disclosure, is described further. The example method may be generally applied in a system as shown in FIG. 1. The method may be performed by a client in the system. Exemplary steps that may be performed in this method are shown by the flow chart in FIG. 4. The method may include the steps 201 to 203 described further.

Step 201, reporting attribute information of a file to a server, and then proceeding to step 202 or 203.

The attribute information may include, but not limited to, at least one of path information of the file, loading information of the file, releasing information of the file, a black-white attribute of the file, context information of a program corresponding to the file and the like.

The client may determine, according to a preset attribute reporting strategy, which attribute information of the file is to be reported by the client. The preset attribute reporting strategy may prescribe particular attribute information of the file to be reported in a particular case. Alternatively, the client may make report the attribute information according to an instruction sent from the server. In this case, the client may receive instruction information sent from the server for instructing to the client which attribute information of the file is to be reported. Further, the instruction information may instruct the client to report particular attribute information of the file in a particular case.

Step 202, may involve receiving a scanning strategy sent by a server. The scanning strategy may indicate whether to scan the file. The scanning strategy may be determined by the server according to the attribute information of the file reported by the clients. Step 202 may be performed by the client, and may involve the server generating the scanning strategy of the file and sending the scanning strategy to the client using steps 101 and 103 in the above embodiment. The client may then perform the scanning in accordance with the scanning strategy.

Step 203, may involve receiving from the server a property indicator of the file. A client, according to the property indicator, may determine a scanning strategy on whether to scan the file. The property indicator may be returned by the server according to the attribute information of the file reported by the plurality of clients. After the client performs step 201, the server may obtain the property indicator using steps 101 to 102 and send the property indicator to the client. In this case, the client further may obtain, or determine, the scanning strategy of the file according to the property indicator. For example, the client may determine whether the property indicator is greater than a preset value. If the property indicator is greater than the preset value, the client may scan the file. And if the property indicator is not greater than the preset value, the client may not scan the file. Thus, the client may scan the file in accordance with the determined scanning strategy.

In this way, a real-time file protection may be provided for the files on the clients. The clients may report the attribute information of the file to the server. The server may determine, using comprehensive consideration of the attribute information of the file reported by a plurality of clients, the property indicator of the file. The property indicator may represent a probability of the file being a malicious program. The server may send the property indicator to the clients, and the clients may determine, according to the property indicator, a scanning strategy as to whether to scan the file. Alternatively, the server may determine, according to the property indicator, a scanning strategy on whether to scan the file, and may send the scanning strategy to the clients. The clients may scan the file in accordance with the scanning strategy for the file. Thus, the file which has a higher probability to be a malicious program may be selectively scanned. Therefore, the amount of the files to be scanned during the protection may be reduced, and correspondingly the spent time is shortened. Any effects, on the other operations in the server may be reduced.

Figure 5:
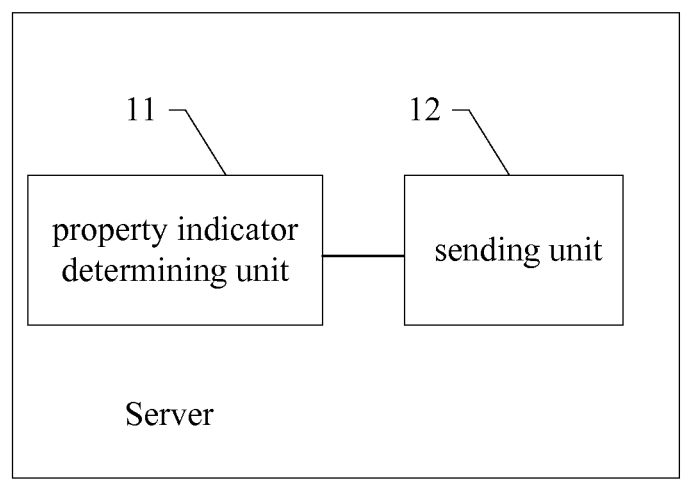
FIG. 5 is a schematic structural diagram of an example server according to an embodiment of the disclosure.

An example server is described below, and units of the server may operate to scan the file in accordance with exemplary steps of the flow chart shown in FIG. 2. The server may perform real-time protection on the file according to the scanning FIG. 5 shows a schematic structural diagram of the example server according to an embodiment, which may include a property indicator determining unit 11 and a sending unit 12.

The server may receive attribute information of the file reported by a plurality of clients. The attribute information may include, but not limited to, at least one of path information of the file, loading information of the file, releasing information of the file, a black-white attribute of the file, context information of a program corresponding to the file and the like.

The property indicator determining unit 11 may determine a property indicator of the file according to the attribute information of the file reported by a plurality of clients. The property indicator may be indicative of probability of the file being a malicious program.

The sending unit 12 may send the property indicator determined by the property indicator determining unit 11 to the clients. The clients may determine according to the property indicator whether to scan the file. Alternatively, the sending unit 12 may determine, or generate, according to the property indicator determined by the property indicator determining unit 11, a scanning strategy on whether to scan the file, and to send the scanning strategy for the file to the clients.

If the sending unit 12 is to send the scanning strategy for the file to the clients, the sending unit may determine, when generating the scanning strategy of the file according to the property indicator, whether the property indicator is greater than a predetermined value. If the property indicator is greater than the predetermined value, it the clients may scan the file. And if the property indicator is not greater than the predetermined value, the clients may not scan the file. Thereby, the scanning strategy for the file is obtained.

Accordingly, the server may provide real time file protection. During the real-time file protection, the property indicator determining unit 11 may determine, by comprehensive consideration of the attribute information of the file reported by the clients, the property indicator of the file. The property indicator may represent a probability of the file being a malicious program. The sending unit 12 may send the property indicator to the clients. In response, the clients may determine according to the property indicator a scanning strategy for the file. The scanning strategy may indicate whether to scan the file. Alternatively, the sending unit 12 may determine, according to the property indicator, a scanning strategy, and send the scanning strategy to the clients. The clients scan the file in accordance with the scanning strategy, either generated by the clients or sent by the sending unit 12. Therefore, the file which has a higher probability to be a malicious program may be selectively scanned. Accordingly, the amount of the files to be scanned during the protection may be reduced, and correspondingly the spent time is shortened. Any effects, on the other operations in the server may be reduced.

Figure 6:
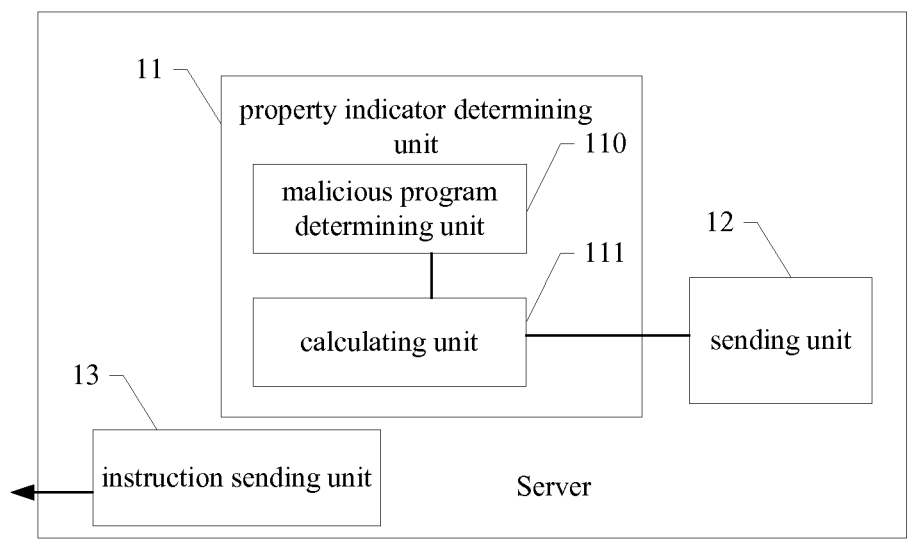
FIG. 6 is a schematic structural diagram of an example server according to another embodiment of the disclosure.

Referring to FIG. 6, in another embodiment, in addition to the structure as shown in FIG. 5, the server may further include an instruction sending unit 13, and the property indicator determining unit 11, further including a malicious program determining unit 110 and a calculating unit 111.

The instruction sending unit 13 may send instruction information to the plurality of clients. The instruction information may be indicative of the attribute information of the file to be reported by the clients.

The malicious program determining unit 110 may determine if a file is a malicious program, based on attribute information of the file reported by each of the clients. The reported attribute information of the file may include information corresponding to one attribute.

The calculating unit 111 may determine the property indicator of the file. For example, the property indicator may be a ratio of the number of clients for which the file is determined as the malicious program to the total number of the clients.

In another example embodiment, the malicious program determining unit 110 may further determine whether the file is a malicious program in case the reported attribute information contains information related to multiple attributes. In such a case, the malicious program determining unit 110 may determine probability of maliciousness, for each one of the plurality of clients, with respect to each of the multiple attributes respectively. The calculating unit 111 may further determine, for each of the multiple attributes of the file, a probability ratio of the file being a malicious program. The probability ratio may be a ratio of the number clients for which the file is determined as a malicious program with respect to the attribute to the total number of the clients. The calculating unit 111 may further determine the property indicator of the file as a sum of the respective probability ratios associated with the file with respect to the multiple attributes. Alternatively the calculating unit 11 may determine the property indicator of the file as a weighted sum of the probability ratios of the file. The weighted probability ratios may be products of the respective probability ratios multiplied with corresponding weights, which may be predetermined.

The instruction sending unit 13 may send the instructions to the clients. The instructions may indicate to the clients the attribute of the file to be reported by the clients. Upon receiving the attribute information of the file reported by the clients, the malicious program determining unit 110 of the property indicator determining unit 11 may determine for each one of the of clients whether the file is a malicious program. The calculating unit 111 may calculate the property indicator according to the information obtained by the malicious program determining unit 110. The sending unit 12 may send the scanning strategy for the file to the clients. The scanning strategy may be determined by the calculating result from the calculating unit 111. Alternatively, the sending unit 12 may send the calculation result from the calculating unit 111 to the clients.

Figure 2:
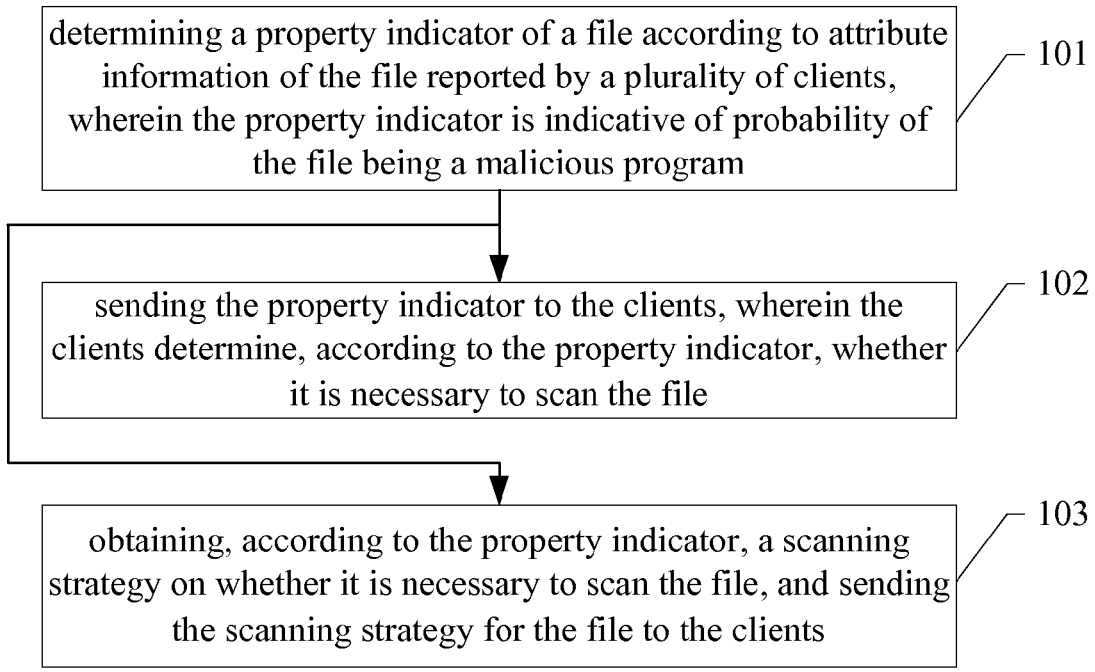
FIG. 2 is a flow chart of exemplary steps performed by an example server during a file scanning method performed according to an embodiment of the disclosure.
Figure 7:
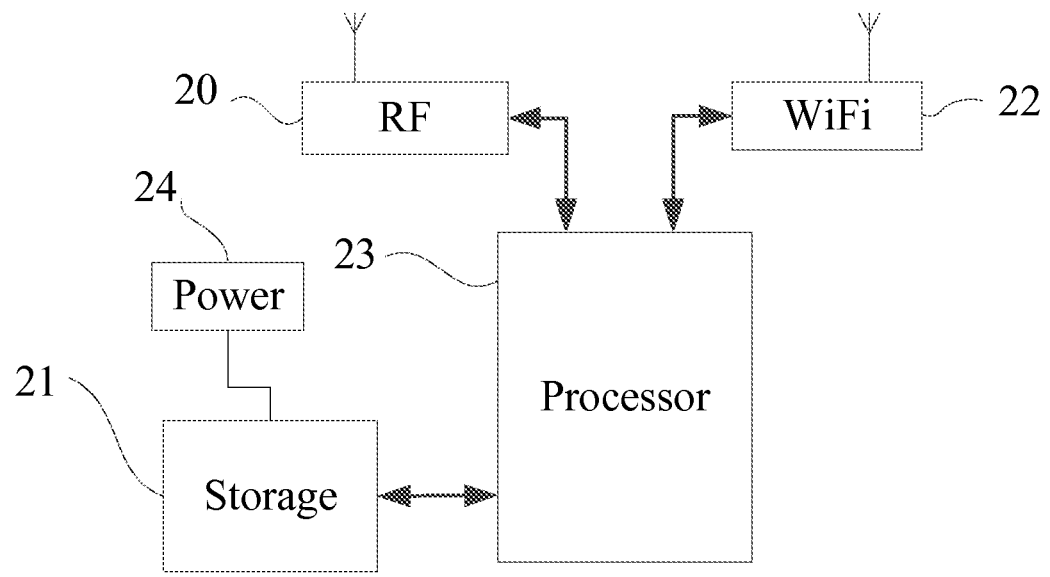
FIG. 7 a schematic structural diagram of an example server according to yet another embodiment of the disclosure.

In another example the file scanning according to an embodiment of the disclosure may involve using the example steps as shown in FIG. 2 in a server. Reference is made to FIG. 7, which shows an example server used in an embodiment.

Specifically, the server may include circuitry such as a Radio Frequency (RF) circuit 20, a storage 21 including one or more computer readable storage medium, a wireless fidelity (WiFi) module 22, such as a communication module of a short-distance wireless transmission technology, a processor 23 including one or more processing cores, a power supply 24 and the like. It can be understood by those skilled in the art that the structure of the server shown in FIG. 7 is not intended to limit the server, more or less components than those shown in Figure may be included in the server, some components may be combined, or the components may be in another arrangement.

The RF circuit 20 may to receive and send information, or receive and send signals during a phone call. Generally, the RF circuit 20 includes, but is not limited to, an antenna, at least one amplifier, a tuner, one or more oscillators, a transceiver, a coupler, a Low Noiser Amplifier (LNA), a duplexer and the like. Further, the RF circuit 20 may communicate with a network or other devices via wireless communication. The wireless communication may be performed according to any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The storage 21 may store software program(s) and module(s). By running the software program(s) and module(s) stored in the storage 21, the processor 23 may perform various functions according to the applications and data processing. The storage 21 may include a program storage area and a data storage area, where the program storage area may store an operating system, an application program required for at least one function (such as, a function of playing audio, a function of displaying image), and the like. The data storage area may store the data (such as a preset attribute reporting strategy) created based on the usage of the server, and the like. Further, the storage 21 may include a high-speed random access memory, a non-volatile memory such as at least one magnetic disk storage, flash storage device, or other volatile solid-state storage device. Accordingly, the storage 21 may further include a storage controller for providing the processor 23 with the access to the storage 21.

The processor 23, as a control center of the server, may be connected to various components of the server via various interfaces and wires. By running or executing the software program(s) and/or module(s) stored in the storage 21, and invoking the data stored in the storage 21, the processor 23 may perform various functions of the terminal and processes the data, so as to monitor the server. The processor 23 may include one or more processing cores. The processor 23 may be integrated with an application processor and a modem processor. The application processor may be involved with the operating system, and the applications, while the modem processor may be involved with the wireless communication. The modem processor may not be integrated in the processor 23.

The server may further include a power supply 24 (such as a battery) for supplying power to various components. The power supply 24 may be logically connected to the processor 23 via a power supply managing system, so as to manage the functions such as charging, discharging and power consumption managing. The power supply 24 may further include one ore more DC or AC power supply, a recharging system, a power supply failure detecting circuit, power supply converter or inverter, power supply state indicator, and any other assembly.

Although it is not specified, the server may further include other circuitry, which will not be described in detail here.

Once the attribute information of the file reported by a plurality of clients is received by the RF circuit 20 of the server, the processor 23 may implement various functions by loading executable files corresponding to one or more processes of an application into the storage 21 and running the application stored in the storage 21 by the processor 23. The functions are described below.

According to the attribute information of the file reported by the plurality of clients, the property indicator of the file may be determined. The property indicator may indicate the probability of the file being a malicious program. The attribute information of the file may include, but is not limited to, at least one of path information of the file, loading information of the file, releasing information of the file, a black-white attribute of the file, context information of a program corresponding to the file and the like.

The RF circuit 20 may be controlled to send the property indicator to the clients. In response, the clients may determine according to the property indicator whether to scan the file and in turn, may perform the scanning strategy on whether it is necessary to scan the file is obtained according to the Alternatively, the RF circuit 20 may be controlled to send the scanning strategy for the file to the clients and instructing the clients to scan (or not scan) in accordance with the scanning strategy.

Further, when determining the property indicator, the attribute information of the file reported by the clients may correspond to one attribute. The processor 23 may determine, according to the attribute information of the file reported by the each one of the plurality of clients, whether the file is a malicious program. The processor 23 may further determine the property indicator of the file as a ratio of the number of clients for which the file is determined as the malicious program to the total number of the clients. Alternatively, the attribute information of the file reported by the clients may correspond to multiple attributes. In this case, the processor 23 may determine, whether the file is a malicious program with respect to each of the multiple attributes reported by each of the multiple clients respectively. The processor 23 may further determine for each of the multiple attributes of the file, a probability ratio of the file being a malicious program with respect to the attribute. The probability ratio associated with an attribute may be a ratio of the clients for which the file is determined as a malicious program according to that attribute to the total number of the clients. The property indicator of the file may be calculated as a sum of the respective probability ratios associated with the file with respect to the multiple attributes. Alternatively, the property indicator of the file may be determined as a sum of weighted probability ratios of the file. The weighted probability ratios may be calculated as the respective probability ratios multiplied with corresponding predetermined weights.

To determine whether to scan the file, the property indicator may be compared with a predetermined value. If the property indicator is greater than the predetermined value, the file may be scanned. And if the property indicator is not greater than the predetermined value, the clients may skip scanning the file.

To control the attribute information of the file reported by the client, the processor 23 may further control the RF circuit 20 to send instruction information to the clients. The instruction information is indicative of the attribute information of the file to be reported by the clients.

Figure 8:
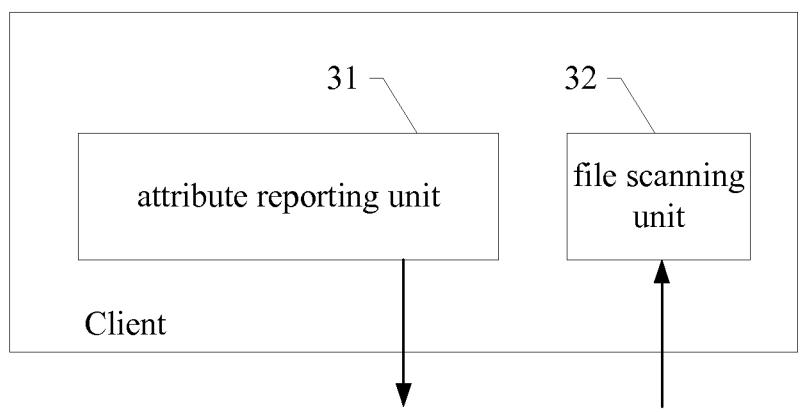
FIG. 8 is a schematic structural diagram of an example client according to an embodiment of the disclosure.

In an example embodiment, a client may be involved in providing real-time file protection. The units of the client according to this embodiment may scan the file using the example method shown in FIG. 3. FIG. 8 shows a schematic structural diagram of an example client, which may include an attribute reporting unit 31 and a file scanning unit 32.

The attribute reporting unit 31 may report to a server the attribute information of the file gathered by a gathering unit (not shown).

The attribute information of the file here may include, but not limited to, at least one of path information of the file, loading information of the file, releasing information of the file, a black-white attribute of the file, context information of a program corresponding to the file and the like.

The client may determine, according to a preset attribute reporting strategy in the client, which attribute information of the file may be gathered. The preset attribute reporting strategy may include a list of attribute information of the file to be reported in specific cases. The client may also determine, which attribute information is to be gathered based on according to instruction sent from the server. The client may further include an instruction receiving unit (not shown in FIG. 8) for receiving the instruction sent from the server. The instruction may indicate the attribute information of the file to be reported by the clients.

The file scanning unit 32 may receive, from the server, a scanning strategy. The scanning strategy may indicate whether to scan the file or not. The scanning strategy is returned from the server according to the attribute information of the file reported by the clients via the attribute reporting unit 31. Alternatively, the file scanning unit 32 may receive from the server a property indicator of the file. A client may develop the scanning strategy, according to the property indicator. The property indicator may be returned from the server according to the attribute information of the file reported by the clients via the attribute reporting unit 31.

The file scanning unit 32 may receive the property indicator sent from the server. Subsequently, it may be determined whether the property indicator is greater than a preset value. If the property indicator is greater than the preset value, the client may scan the file. And if the property indicator is not greater than the preset value, the client may not scan the file. Thus, the scanning strategy for the file is generated.

A real-time file protection technique can thus be employed by the client and the server. To provide the real-time file protection, the client may send the attribute information of the file to the server. The server may determine a property indicator of the file based on the attribute information of the file reported by the clients. The property indicator of the file may be the probability of the file being a malicious program. The server may send the property indicator to the clients. In response, the clients may determine, according to the property indicator, a scanning strategy on whether to scan the file. Alternatively, the server may determine, according to the property indicator, a scanning strategy on whether to scan the file, and may send the scanning strategy to the clients. The file scanning unit 32 in the clients may scan the file in accordance with the scanning strategy. Accordingly, only the file which has a higher probability to be a malicious program may be selectively scanned. Therefore, the number of the files to be scanned during the protection can be reduced, and the corresponding time spent is shortened. Further, effects of the real-time file protection service on the other operations in the server may be reduced.

In yet another example, the file scanning method according to the embodiment of the disclosure as shown in FIG. 3 may be used in a terminal. The terminal may include an intelligent telephone, a tablet, an electronic book reader, a Moving Picture Experts Group Audio Layer III (MP3) player, a Moving Picture Experts Group Audio Layer IV (MP4) player, a laptop portable computer, a desktop computer and the like.

Figure 9:
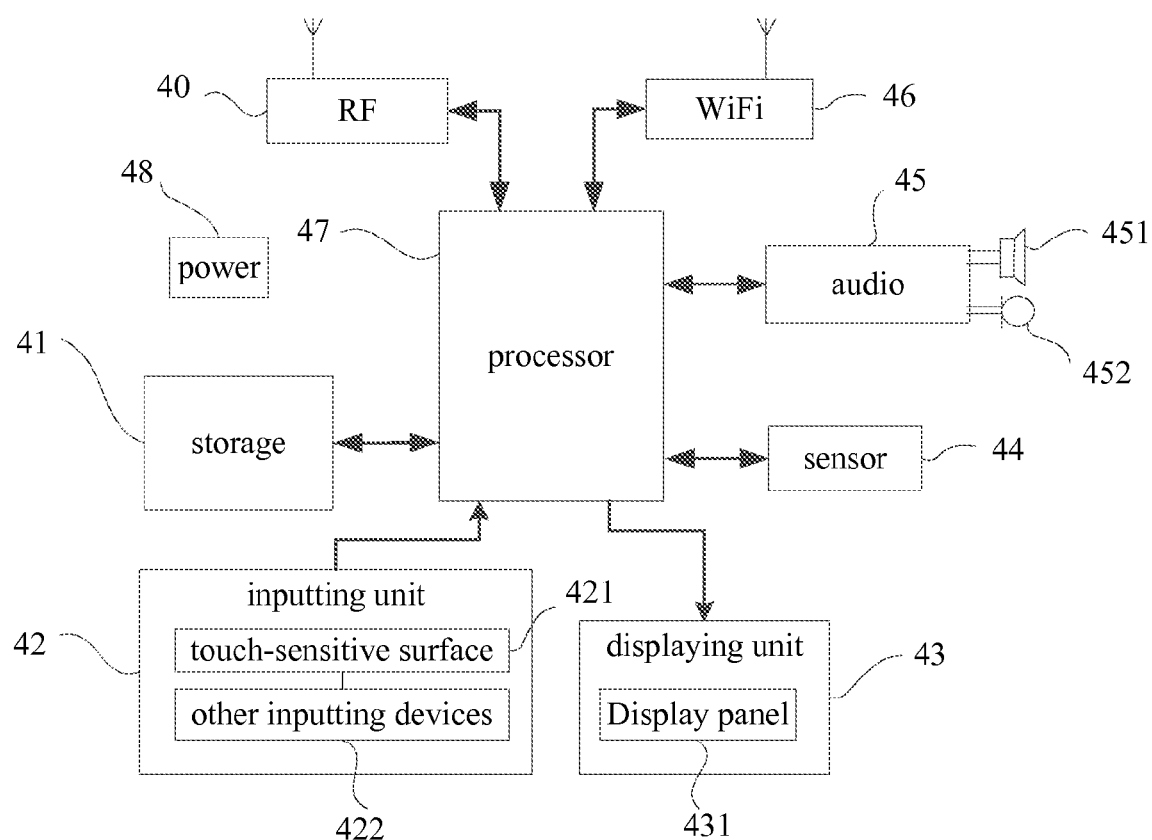
FIG. 9 is a schematic structural diagram of an example client according to another embodiment of the disclosure.

Reference is made to FIG. 9, which shows a schematic structural diagram of a terminal according to an embodiment of the disclosure.

The terminal may include circuitry such as a Radio Frequency (RF) circuit 40, a storage 41 including one or more computer readable storage medium, an inputting unit 42, a displaying unit 43, a sensor 44, an audio circuit 45, a wireless fidelity (WiFi) module 46, a processor 47 including one or more processing cores, a power supply 48 and the like. It can be understood by those skilled in the art that the structure of the terminal shown in FIG. 9 is not intended to limit the terminal, more or less components than shown in FIG. 9 may be included in the terminal, some components may be combined, or the components may be in another arrangement.

The RF circuit 40 may receive and send information, or receive and send signals during the phone call. Particularly, after receiving a downlink information from a base station, the RF circuit 40 may send the downlink information to one or more processors 47 for processing. Further, the RF circuit 40 may send uplink data to the base station. The RF circuit 40 may include, but is not limited to, an antenna, at least one amplifiers, a tuner, one or more oscillators, a Subscriber Identify Module (SIM) card, a transceiver, a coupler, a Low Noise Amplifier (LNA), a duplexer and the like. Further, the RF circuit 40 may communicate with a network or other devices via wireless communication. The wireless communication may be performed according to any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The storage 41 may store software program(s) and module(s). By running the software program(s) and module(s) stored in the storage 41, the processor 47 may perform various functions of the terminal, execute applications and perform data processing. The storage 41 may include a program storage area and a data storage area. The program storage area may store an operating system, an application program necessary for at least one function (such as audio playing function, and image playing function), and the like. The data storage area may store the data (such as audio data and telephone dictionary) created according to the usage of the terminal, and the like. Further, the storage 41 may include a high-speed random access memory, a non-volatile memory such as at least one disk storage device, flash storage device, or other volatile solid-state storage device. Accordingly, the storage 41 may further include a storage controller for providing the processor 47 and the inputting unit 42 with the access to the storage 41.

The inputting unit 42 may receive as input, numeric or character information, and generate keyboard, mouse, operating lever, optical or track ball signal input related to the user setting and the function control. In an embodiment, the inputting unit 42 may include a touch-sensitive surface 421 and other inputting devices 422. The touch-sensitive surface 421, also referred to as a touch screen or touch panel, may capture the touch operation performed by the user nearby or on the touch-sensitive surface (such as the operation of the user on the touch-sensitive surface 421 or nearby the touch-sensitive surface 421 using a finger, a stylus or any suitable object or accessory), and drive a corresponding connecting device according to a preset program. The touch-sensitive surface 421 may include two components, such as, a touch detecting device and a touch controller. The touch detecting device may detect the touch position of the user, a signal caused by the touch operation, and may send the signal to the touch controller. The touch controller may receive the touch information from the touch detecting device, convert the touch information into coordinates of the touch position, send the coordinates to the processor 47, and receive a command sent from the processor 47 and execute the command. Further, the touch-sensitive surface 421 may be implemented in various manners, such as resistive, capacitive, infrared and surface acoustic wave. In addition to the touch-sensitive surface 421, the inputting unit 42 may further include other inputting devices 422. The other inputting devices 422 may include, but is not limited to, one or more of a physical keyboard, a function key, (such as a volume controlling key and a switching key), a track ball, a mouse, an operating rod and the like.

The displaying unit 43 may display the information input from the user, the information provided to the user, and various graphic user interface of the terminal. The graphic user interface of the terminal may be composed of image, text, icon, video or any composition thereof. The displaying unit 43 may include a displaying panel 431. The displaying panel 431 may be configured by a Liquid Crystal Display (LCD), an Organic Light-Emitting Diode (OLED) and the like. Further, the playing panel 431 may be covered by the touch-sensitive surface 421. Upon detecting the touch operation on or nearby the touch-sensitive surface 421, the touch-sensitive surface 421 may send the touch information to the processor 47 for determining the type of the touch event. Then the processor 47 may provide corresponding visual output on the displaying panel 431 according to the type of the touch event. Although in FIG. 9 the touch-sensitive surface 421 and the displaying panel 431 perform the inputting function and the outputting function as two separate components, in some embodiments, the touch-sensitive surface 421 and the displaying panel 431 may be integrated to achieve the inputting function and the outputting function.

The terminal may also include at least one sensor 44, such as an optical sensor, a motion sensor and any other sensor. The optical sensor may include an ambient light sensor and a proximity sensor. The ambient light sensor may adjust the brightness of the displaying panel 431 according to the intensity of ambient lights. The proximity sensor may turn off the displaying panel 431 and/or the backlight when the terminal moves close the ear. As one kind of the motion sensor, a gravity acceleration sensor may detect the values of the accelerations in various directions (for example, three axes) and detect the value and direction of the gravity when remaining stationary. The gravity acceleration sensor may be applied in an application for recognizing orientation of a mobile phone (for example, switching between landscape and portrait, relevant games, magnetometer pose calibration), a function related to vibration recognition (for example, a pedometer, knocking) and other such applications In addition, other sensors, such as, a gyroscope, a barometer, a hygrometer, a thermometer, an infrared sensor and the like may be further provided in the terminal.

The audio circuit 45, the speaker 451 and the microphone 452 may provide the audio interface between the user and the terminal. The audio circuit 45 may send the electrical signal converted from the received audio data to the speaker 451 and a voice signal may be converted from the electric signal and output by the speaker 451. In another aspect, the microphone 452 may convert the collected sound signal into an electrical signal. The audio circuit 45 may receive the electrical signal and convert the electrical signal into audio data to be output to the processor 47 for processing. The processed audio data may be sent to for example another terminal via the RF circuit 40. Alternatively, the audio data may be output to the storage 41 for further processing. The audio circuit 45 may further include an earplug jack for providing the communication between an external earphone and the terminal.

WiFi is a technology for short-distance wireless transmission. Via the WiFi module 46, the terminal may help the user to receive and send an e-mail, browse a web page, access a stream media, provide the user with wireless wideband Internet access. Although the WiFi module 46 is shown in FIG. 9, it can be understood that the WiFi module 46 may be omitted in example terminal devices without deviating from the scope of the spirit of the disclosure.

The processor 47, as a control center of the terminal, may be connected with various components of the terminal via various interfaces and wires. By running or performing the software program(s) and/or module(s) stored in the storage 41 and revoking the data stored in the storage 41, the processor 47 may perform various functions of the terminal and processes data, so as to monitor the whole terminal. Optionally, the processor 47 may include one or more processing cores. The processor 47 may be integrated with an application processor and a modem processor, where the application processor may be involved with the operating system, the user interface, the applications, and the modem processor may be involved with the wireless communication. It can be understood that it is also possible that the above modem processor is not integrated in the processor 47.

The terminal further may include a power supply 48 (such as a battery) for supplying power to various components. The power supply 48 may be logically connected to the processor 47 via a power supply managing system, so as to manage the functions such as charging, discharging and power consumption managing. The power supply 48 may further include one ore more DC or AC power supply, a recharging system, a power supply failure detecting circuit, power supply converter or inverter, power supply state indicator, and any other assembly.

The terminal may further include a camera, a Bluetooth module and the like, for which the description is omitted. In this embodiment, the processor 47 in the terminal may implement various functions by loading executable files corresponding to one or more processes of an application into the storage 41 and running the application stored in the storage 41 by the processor 47. The functions may include at least the following.

The attribute information of the file may be gathered, for example according to the instruction sent from the server and received by the RF circuit 40. The instruction may be indicative of the attribute information of the file to be reported by the client. The gathered attribute information of the file may include, but is not limited to, at least one of path information of the file, loading information of the file, releasing information of the file, a black-white attribute of the file, context information of a program corresponding to the file and the like.

The RF circuit 40 may be controlled to report the attribute information of the file to the server.

Upon receiving, at the RF circuit 40, the scanning strategy from the server the terminal may scan the file in accordance with the scanning strategy. The scanning strategy indicates whether to scan a file (or not). The scanning strategy is returned from the server according to the attribute information of the file sent from the clients. Alternatively, the property indicator of the file, may be received by the RF circuit 40. The terminal may, in response generate, according to the property indicator, the scanning strategy as to whether to scan the file. The property indicator may be returned by the server according to the attribute information of the file reported by the plurality of clients. In either case, the terminal may scan the file in accordance with the scanning strategy.

To generate the scanning strategy according to the property indicator, the processor 47 may determine whether the property indicator is greater than a preset value. If the property indicator is greater than the preset value, the client may scan the file. And if the property indicator is not greater than the preset value, the client may not scan the file.

An example file scanning system in an embodiment may include a server, for example as shown in FIG. 5 or 6 and a plurality of clients, for example as shown in FIG. 8.

Another example file scanning system may include a server such as the server as shown in FIG. 7 and a plurality of clients such as those shown in FIG. 9.

It should be understood by those skilled in the art that all or some of the steps in the methods according to the embodiments of the disclosure may be performed by a corresponding hardware instructed with a program. The program may be stored in a computer readable storage medium. The computer readable storage medium may include Read Only Memory (ROM), Random Access Memory (RAM), magnetic disk, Compact Disk, and others.

Various examples and embodiments of a file scanning method and file scanning system, which may involve at least one client and server, are described in detail above. The principle and implementation of the disclosure are illustrated with specific examples, which are set forth only for the purpose of better understanding of the method and core concept of the disclosure; changes to the specific embodiments and the application scope may be made by those skilled in the art based on the spirit of the disclosure, and the specification is not intended to limit the disclosure by the examples.

What is claimed is:

1. A computer implemented file scanning method, comprising:
    determining by a server computer, a property indicator of a file according to attribute information of the file for a set of at least one attribute each reported by a plurality of separate client computers, wherein the property indicator is a function of a corresponding set of at least one maliciousness indicator each being separately determined based on the reported attribute information for each of the set of at least one attribute, and wherein the property indicator is indicative of a probability of the file being a malicious program;
    sending the property indicator to the client computers; and
    generating a scanning strategy according to the property indicator, and sending the scanning strategy to the client computers, wherein the scanning strategy indicates whether to scan the file.

2. The method according to claim 1, wherein the attribute information comprises a path information of the file, a loading information of the file, a releasing information of the file, a black-white attribute of the file, and a context information of a program corresponding to the file.

3. The method according to claim 1, wherein the set of at least one attribute comprises a single attribute, and wherein the determination of the property indicator of the file comprises:
determining for each one of the plurality of client computers, whether the file is a malicious program, according to the attribute information reported by each respective one of the plurality of client computers; and
determining the property indicator of the file by calculating a ratio of number of client computers for which the file is determined as being a malicious program to a total number of the plurality of client computers.

4. The method according to claim 1, wherein the set of at least one attribute comprises multiple attributes, and wherein the determination of the property indicator of the file comprises:
determining for each one of the plurality of client computers, whether the file is a malicious program with respect to each of the multiple attributes, according to the attribute information corresponding to each respective one of the multiple attributes reported by each respective client computer;
determining, for an attribute of the multiple attributes of the file, a probability ratio indicative of the file being a malicious program with respect to the attribute, wherein the probability is a ratio of a number of client computers for which the file is determined as the malicious program with respect to the attribute to a total number of the plurality of client computers; and
determining the property indicator of the file by:
calculating a sum of the respective probability ratios associated with the file with respect to the multiple attributes, or
calculating a sum of weighted probability ratios of the file with respect to the multiple attributes, wherein the weighted probability ratios are products of the respective probability ratios and corresponding weights.

5. The method according to claim 1, wherein the generation of the scanning strategy comprises:
comparing the property indicator with a preset value;
determining that the file is to be scanned, in response to the property indicator being greater than the preset value; and
determining that the file is not to be scanned, in response to the property indicator being not greater than the preset value.

6. The method according to claim 1, further comprising, sending instruction to the plurality of client computers, wherein the instruction prescribes the set of least one attribute to be included in the attribute information of the file to be reported by the client computers.

7. A computer implemented file scanning method, comprising:
reporting to a server, by each of a plurality of separate client computers, attribute information of a file for a set of at least one attribute;
receiving from the server, a scanning strategy for the file, wherein the scanning strategy is generated by the server according to the attribute information of the file reported by the plurality of clients, wherein the scanning strategy indicates whether to scan the file; and
receiving from the server, a property indicator of the file, wherein the property indicator is sent by the server and is a function of a set of at least one maliciousness indicator corresponding to the set of at least one attribute, each maliciousness indicator being separately determined based on the reported attribute information for each of the set of at least one attribute.

8. The method according to claim 7, wherein the attribute information comprises at least one of path information of the file, loading information of the file, releasing information of the file, a black-white attribute of the file and context information of a program corresponding to the file.

9. The method according to claim 7, further comprising:
comparing the property indicator with a preset value,
determining to scan the file in response to the property indicator being greater than the preset value; and
determining not to scan the file in response to the property indicator is not greater than the preset value.

10. The method according to claim 7, further comprising:
receiving instruction information sent from the server, wherein the instruction information prescribes the set of at least one attribute to be included in the attribute information of the file to be reported by the client computers.

11. A server, comprising:
a storage having codes stored therein; and
one or more processors, when executing the codes, configured to:
determine a property indicator of a file according to attribute information of the file for a set of at least one attribute each reported by a plurality of separate client computers, wherein the property indicator is a function of a corresponding set of at least one maliciousness indicator each being separately determined based on the reported attribute information for each of the set of at least one attribute, and wherein the property indicator is indicative of probability of the file being a malicious program;
send the property indicator to the client computers; and
generate, according to the property indicator, a scanning strategy indicative of whether to scan the file, and send the scanning strategy for the file to the client computers.

12. The server according to claim 11, wherein the one or more processors, when executing the codes, is further configure to:
determine, in response to the attribute information of the file reported by the plurality of client computers for the set of at least one attribute comprising a single attribute and for each one of the plurality of clients, whether the file is a malicious program, based on the attribute information of the file reported by each respective one of the plurality of client computers; and
determine the property indicator of the file by calculating a ratio of a number of client computers for which the file is determined as a malicious program to a total number of the plurality of client computers.

13. The server according to claim 11, wherein the one or more processors, when executing the codes, is further configure to:
determine, in response to the attribute information of the file reported by the plurality of client computers for the set of at least one attribute comprising multiple attributes and for each one of the plurality of clients, whether the file is a malicious program with respect to each respective one of the multiple attributes, based on the information corresponding to each of the multiple attributes reported by each client computer; and determine a probability ratio for each of the multiple attributes of the file, wherein a probability ratio associated with an attribute indicates a probability of the file being a malicious program according to the attribute, and wherein the probability ratio is a ratio of the number of client computers for which the file is determined as the malicious program according to the attribute to the total number of the plurality of client computers; and determine the property indicator of the file by calculating a sum of the respective probability ratios associated with the file with respect to the multiple attributes, or to determine the property indicator of the file by calculating a sum of weighted probability ratios of the file with respect to the multiple attributes, wherein the weighted probability ratios are products of the respective probability ratios and corresponding weights.

14. The server according to claim 11, wherein the one or more processors, when executing the codes to generate the scanning strategy, is configured to:
compare the property indicator with a preset value,
determine to scan the file in response to the property indicator being greater than the preset value, and
determine to not scan the file in response to the property indicator being not greater than the preset value.

15. The server according to claim 11, the one or more processors, when executing the codes, is further configured to:
send instruction information to the plurality of client computers, wherein the instruction information prescribes the set of least one attribute to be included in the attribute information of the file to be reported by the client computers.

* * * * *